United States Patent
Angell et al.

(10) Patent No.: US 10,424,803 B2
(45) Date of Patent: Sep. 24, 2019

(54) IONIC LIQUID CATHOLYTES AND ELECTROCHEMICAL DEVICES CONTAINING SAME

(71) Applicant: ARIZONA BOARD OF REGENTS FOR AND ON BEHALF OF ARIZONA STATE UNIVERSITY, Scottsdale, AZ (US)

(72) Inventors: Charles Austen Angell, Mesa, AZ (US); Leigang Xue, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 184 days.

(21) Appl. No.: 15/508,032

(22) PCT Filed: Sep. 15, 2015

(86) PCT No.: PCT/US2015/050268
§ 371 (c)(1),
(2) Date: Mar. 1, 2017

(87) PCT Pub. No.: WO2016/044324
PCT Pub. Date: Mar. 24, 2016

(65) Prior Publication Data
US 2017/0309943 A1  Oct. 26, 2017

Related U.S. Application Data (60) Provisional application No. 62/050,243, filed on Sep. 15, 2014, provisional application No. 62/138,710, filed on Mar. 26, 2015.

(51) Int. Cl.
*H01M 8/18* (2006.01)
*H01M 4/86* (2006.01)
*H01M 8/20* (2006.01)

(52) U.S. Cl.
CPC ......... *H01M 8/188* (2013.01); *H01M 4/8652* (2013.01); *H01M 8/20* (2013.01); *Y02E 60/528* (2013.01)

(58) Field of Classification Search
CPC ...... H01M 8/188; H01M 4/8652; H01M 8/20; Y02E 60/528
See application file for complete search history.

(56) References Cited

U.S. PATENT DOCUMENTS

| 3,404,035 A | 10/1968 | Kummer et al. |
| 2010/0239893 A1 | 9/2010 | Gordon et al. |

(Continued)

FOREIGN PATENT DOCUMENTS

CN   103956458 A * 7/2014

OTHER PUBLICATIONS

Wen, Y. H., et al. "A study of the Fe (III)/Fe (II)—triethanolamine complex redox couple for redox flow battery application." Electrochimica Acta 51.18 (2006): 3769-3775. (Year: 2006).*

(Continued)

*Primary Examiner* — Stewart A Fraser
(74) *Attorney, Agent, or Firm* — Fish & Richardson P.C.

(57) ABSTRACT

An ionic liquid catholyte includes an ionic liquid, such as 1-ethyl-3-methylimidazolium chloride (EMICl), at least one half of a redox couple, and a sodium salt. The ionic liquid catholyte is suitable for use as a liquid cathode in an electrochemical device including an anode current collector, an anode in contact with the anode current collector, a cathode current collector, a liquid cathode in contact with the cathode current collector, and a solid electrolyte separating the anode and cathode current collectors. The one half of the redox couple includes a metal in a first oxidation state that is oxidized or reduced to yield the metal in a second oxidation state, and the redox couple includes the metal in (Continued)

the first oxidation state and the metal in the second oxidation state. The solid electrolyte is permeable to sodium ions and is in contact with the liquid anode and the liquid cathode.

18 Claims, 6 Drawing Sheets

(56) References Cited

U.S. PATENT DOCUMENTS

| | | |
|---|---|---|
| 2010/0297522 A1 | 11/2010 | Creeth et al. |
| 2010/0297537 A1 | 11/2010 | Coors et al. |
| 2011/0006270 A1 | 1/2011 | Armand et al. |
| 2013/0298386 A1 | 11/2013 | Tarascon et al. |
| 2014/0065456 A1 | 3/2014 | Bhavaraju et al. |

OTHER PUBLICATIONS

English machine translation of Yang et al. (CN 103956458 A) (Year: 2014).*
International search report for PCT/US2015/050268, dated Nov. 25, 2015, 4 pages.
Written opinion for PCT/US2015/050268, dated Nov. 25, 2015, 7 pages.
Katayama, Y. et al., "Redox reaction in 1-ethyly-3-methylimidazolium-iron chlorides molten salt system for battery application", Journal of Power Sources, vol. 109, No. 2, pp. 327-332 (2002).
Xue, L. et al., "Ionic liquid redox catholyte for high energy efficiency, low-cost energy storage", Advanced Energy Materials, vol. 5, No. 12, pp. 1-8 (2015).
Tokoi, H., et al., "Evaluation of sodium sulfur cell characteristics using an in situ X-ray computed tomogram system", J. Electrochem. Soc., 146 (11), pp. 4005-4008 (1991).
Coetzer, J., "A New High Energy Density Battery System", J. Power Sources 18, pp. 377-380 (1986).
Sudworth, J. L., "Zebra batteries", Journal of Power Sources 51, pp. 105-114 (1994).
Kreuer, K. D. et al., "NASICON solid electrolytes. Part IV Chemical Durability", Mat. Res. Res. Bull. 21, pp. 357-363 (1986).
Kim, K. et al., "The Role of Additives in the Electroreduction of Sodium Ions in Chloroaluminate-Based Ionic Liquids", J. Electrochem. Soc. 152, pp. E9-E13 (2005).
Ueno, K., et al., "Ionic liquids as oxidic media for electron transfer studies", J. Chem. Phys. 136, pp. 244501-244507 (2012).
Lipsztajn, M. et al. "Electrochemistry in neutral ambient-temperature ionic liquids. 1 Studies of iron(III), nyodymium (III) and lithium(I)", Inorganic Chemistry 24, pp. 716-719 (1985).
Chen, P. Y. et al., "Electrochemical study of copper in a basic 1-ethyl-3-methylimidazolium tetrafluoroborate room temperature molten salt", Electrochimica Acta 45, pp. 441-450 (1999).
Leong, T. I. et al., "Electrochemical study of copper in the 1-ethyl-3-methylimidazolium dicyanamide room temperature ionic liquid", Journal of the Electrochemical Society 155, pp. F55-F60 (2008).
Tucker, T. G. et al., "Approaches to, and Problems with, Ionic Liquid Electrolytes for Alkali Metal Electrochemical Devices: The Case of Low-Melting Chloroaluminate Binary Solutions", J. Electrochem. Soc. 161 (12), pp. H796-H801 (2014).
Hayamizu, K. et al., "Ionic conduction and ion diffusion in binary room-temperature ionic liquids composed of [emim [BF4] and LiBF4.", J. Phys. Chem. B 108, pp. 19527-19532 (2004).
Ye, H., et al., "Ion Conducting Polymer Gel Electrolytes Based on Ionic Liquid/PVDF-HFP Blends", Journal of the Electrochemical Society, 154 (11), pp. A1048-A1057 (2007).
Koronaios, P. et al. "CaCl2 and MgCl2 as Buffering Agents for Room-Temperature Chloroaluminate Ionic Liquid", J. Electrochem. Soc. 146 (8), pp. 2995-2999 (1999).
Reed, D. et al. "Wetting of sodium on $\beta''$-Al2O3/YSZ composites for low temperature planar sodium-metal halide batteries", J. Power Sources 227, pp. 94-100 (2013).
Ellis, B. L. et al., "Sodium and sodium ion energy storage batteries", Current opinion in Solid State and Materials Science 16, pp. 168-177 (2012).
Li, G.-S. et al., "Cell degradation of a Na-NiCl2 (ZEBRA) battery", J. Mater. Chem. A 1, pp. 14935-14942 (2013).
Eccleston, A. et al. "Molten sodium battery with NaSICON Ceramic Membrane", Honolulu PRiME 2012, The Electrochem. Soc. Abstract No., p. 1875 (2012).
Weaving et al, "Experimental studies of transition metal chloride electrodes in undivided cells using molten NaAlCl4 electrolyte," J. Power Sources 36(4), Dec. 1991, 537-546.
Li et al., "Aluminum as anode for energy storage and conversion: a review," J. Power Sources 110, Jul. 2002, 1-10.

* cited by examiner

IONIC LIQUID CATHOLYTES AND ELECTROCHEMICAL DEVICES CONTAINING SAME

CROSS REFERENCE TO RELATED APPLICATIONS

This application is a U.S. National Phase Application of International Patent Application No. PCT/US2015/050268 filed on Sep. 15, 2015, which claims the benefit of U.S. Provisional Application Ser. No. 62/138,710, filed Mar. 26, 2015, and 62/050,243, filed Sep. 15, 2014, the contents and disclosures of each of which are incorporated herein by reference in their entirety.

STATEMENT OF GOVERNMENT SUPPORT

This invention was made with government support under 1111357 awarded by the Department of Energy. The government has certain rights in the invention.

TECHNICAL FIELD

The present invention relates to ionic liquid catholytes and electrochemical devices containing the same.

BACKGROUND

Molten salt batteries ("liquid sodium" batteries) that use liquid sodium as the anode have been studied for the powering of electric vehicles and most recently for energy storage and load-balancing of environment-dependent power plants (solar, wind, etc.). However, due to the high operating temperatures (e.g., >300° C.) needed to maintain good kinetics in the solid electrolyte and solid cathode ($NiCl_2$) materials, they encounter problems of thermal management and safety, and also impose stringent requirements on the rest of the battery components.

SUMMARY

In a first general aspect, an electrolyte includes an ionic liquid, at least one half of a redox couple, and a sodium salt. The ionic liquid includes 1-ethyl-3-methylimidazolium chloride (EMICl).

Implementations of the first general aspect may include one or more of the following features. In some cases, the redox couple includes a metal in two different oxidation states (e.g., Fe(II) and Fe(III), Mn(II) and Mn(III), Cu and Cu(II), Cu and Cu(I), Cu(I) and Cu(II), Cr(III) and Cr(VI), or Mo(III) and Mo(VI)). The ionic liquid may be a salt or a combination of salts in the liquid state below 100*C. The electrolyte may include an aluminum salt (e.g., aluminum chloride). The sodium salt may include sodium chloride. In certain cases, the electrolyte is formed from a mixture including EMICl, $FeCl_3$, NaCl, and $AlCl_3$.

In a second general aspect, a battery includes an anode current collector, an anode in contact with the anode current collector, a cathode current collector, a liquid cathode in contact with the cathode current collector, and a solid electrolyte separating the anode current collector and the cathode current collector. The one half of the redox couple includes a metal in a first oxidation state that is oxidized or reduced to yield the metal in a second oxidation state, and the redox couple includes the metal in the first oxidation state and the metal in the second oxidation state. The solid electrolyte is permeable to sodium ions and is in contact with the liquid anode and the liquid cathode. The liquid cathode includes a catholyte solution including an ionic liquid or ionic liquid mixture, a redox couple or one half of a redox couple, and a sodium salt.

Implementations of the second general aspect may include one or more of the following features.

In some cases, the ionic liquid includes 1-ethyl-3-methylimidazolium chloride (EMICl). The metal in the second oxidation state can be (or is) reduced or oxidized to yield the metal in the first oxidation state. The redox couple may include Fe(II) and Fe(III), Mn(II) and Mn(III), Cu and Cu(II), Cu and Cu(I), Cu(I) and Cu(II), Cr(III) and Cr(VI). In certain cases, the ionic liquid is a salt or a combination of salts in the liquid state below 100° C. The catholyte may include an aluminum salt (e.g., aluminum chloride). The sodium salt may include sodium chloride.

In some instances, the solid electrolyte includes a material having the general formula $Na_{1+x}Zr_2Si_xP_{3-x}O_{12}$, wherein $0<x<3$. The solid electrolyte may be coated with indium tin oxide.

In certain instances, the anode includes liquid sodium or sodium alloy at a temperature in a range between 100° C. and 200° C.

The battery may deliver at least 70% of its theoretical energy density. In some cases, the energy efficiency (E %) of the battery, calculated as:

$$\text{Energy efficiency} = \frac{\int v_{discharge} i_{discharge} dt}{\int v_{charge} i_{charge} dt} \approx \frac{V_{mid-discharge} C_{discharge}}{V_{mid-charge} C_{charge}},$$
$$= (\text{voltage efficiency})(\text{coulombic efficiency})$$

is at least 90%. In certain cases, the Coulombic efficiency of the battery is at least 95%.

In one example, an electrochemical device includes an anode and a Fe-based ionic liquid redox catholyte. The cathode uses highly conducting 1-ethyl-3-methylimidazolium-iron chloride ($EMIFeCl_4$) diluted with $NaAlCl_4$. $Na^+$ cations from the $NaAlCl_4$ exchange with the anode across a NaSICON separator as the oxidation state of Fe decreases during discharge and increases during recharge. The battery works well at 180° C., shows an open circuit voltage (OCV) of 3.31 V, and can deliver 73% of its theoretical energy density (288 Wh/kg and 418 Wh/L). The energy efficiency is above 96%.

Advantages of the electrolytes and electrochemical devices described herein include high output voltage, low operating temperature, low materials costs, and apparent immunity to internal shorts, resulting in a low fire hazard.

Thus, particular embodiments have been described. Variations, modifications, and enhancements of the described embodiments and other embodiments can be made based on what is described and illustrated. In addition, one or more features of one or more embodiments may be combined. The details of one or more implementations and various features and aspects are set forth in the accompanying drawings, the description, and the claims below.

DETAILED DESCRIPTION

Liquid sodium-based batteries with ionic liquid redox catholytes are described herein. These liquid sodium-based batteries include liquid catholytes and solid electrolyte separators (e.g., NaSICON sodium-ion ceramic conductors) and operate in an intermediate temperature range (e.g., 100° C.-200° C.). NaSICON, which has the general formula Na$_{1+x}$Zr$_2$Si$_x$P$_{3-x}$O$_{12}$, 0<x<3, can exhibit conductivities on the order of 10$^{-2}$ S cm$^{-1}$ at 120° C. For cathode materials and electrolytes, ionic liquids (ILs) (i.e., ionic materials that remain liquid at or close to room temperature) provide a route to high conductivity catholytes that can serve at intermediate temperature. As used herein, "catholyte" generally refers to a liquid that can work as both cathode and electrolyte in a battery. At moderate temperatures (>100° C.), problems associated with low alkali ion mobility may be overcome, such that redox couples and Na ions (the "catholyte") can work well at temperatures not much above the melting point of sodium. The catholyte, as described herein, is an ambient temperature, freely flowing liquid, and thus is suitable to serve in a flow battery system.

Liquid sodium cells described herein may include one or more suitable redox couples, such as, for example, Fe(II)/Fe(III), Mn(II)/Mn(III), Cu/Cu(II), Cu/Cu(I), Cu(I)/Cu(II), Cr(III)/Cr(IV), Cr(III)/Cr(VI) and the like as active cathode material. Examples of suitable catholytes include [EMIFeCl$_4$]$_x$[NaAlCl$_4$]$_y$ (0<x≤1, 0≤y<1, x+y=1) (NaAlCl$_4$ dissolved in EMIFeCl$_4$ at room temperature), [EMIFe$_2$Cl$_7$]$_x$[NaAlCl$_4$]$_y$ (0<x≤1, 0≤y<1, x+y=1), [EMICl]$_x$[FeCl$_3$]$_y$[AlCl$_3$]$_z$[NaCl]$_w$ (0<x<1, 0<y<1, 0≤z<1, 0≤w<1).

A class of reactions including redox couple Fe(II)/Fe(III) is shown in Equation (1):

(1)

This reaction occurs in an ionic liquid medium at temperatures where the sodium is in the liquid state. In one example, [EMIAlCl$_4$] [NaFeCl$_4$] is used as an ionic liquid medium. This combination has wide composition domains that are liquid at room temperature, allowing manipulation of the cell during assembly.

Examples of reactions including this redox couple are shown in Equations (2) and (3):

(2)

(3)

In Equation (2), solid NaCl is formed. In Equation (3), NaCl is maintained in solution.

In Equation (2), additional NaAlCl$_4$ (or EMIAlCl$_4$ or EMIFeCl$_4$) may be added to compensate for the higher melting trichloroferrate species that is generated during discharge, in order to maintain the electrolyte in the liquid state (except for the precipitated NaCl). FeCl$_3^-$ is not a trigonal anion, but a chain of chloride-bridged tetrahedra, [Fe(II)Cl$_4$]$_n$, and tends to be viscous.

Compared to a liquid sodium with that undergoes the charge/discharge process of Equation (2), a liquid sodium cell that undergoes the charge/discharge process of Equation (3) is expected to have a higher cell potential (due at least in part to the increased acidity of the Fe$_2$Cl$_7^-$ anion) as well as an enhanced capacity (based on Fe as the limiting species) and less need for inactive EMIAlCl$_4$ to maintain the liquid state of the electrolyte.

The cell capacities, expressed in mAhg$^{-1}$, may depend at least in part on the composition of the catholyte that is needed (i) to maintain the liquidus temperatures below operating temperatures, and (ii) to optimize conductivities. For the choice made in cells described herein, the electrolyte had the simple molar composition EMICl, FeCl$_3$, NaCl and AlCl$_3$ in mole ratio 1:1:1:1, which is the same as [EMI][AlCl$_4$]$_{0.5}$[NaFeCl$_4$]$_{0.5}$. Ternary compositions, such as [EMI][FeCl$_4$]$_x$[EMI][AlCl$_4$]$_y$[NaFeCl$_4$]$_z$, (x+y+z=1.0), which maintain high conductivity during discharge, are also suitable.

For the cell reaction of Equation (2), the theoretical capacity based on complete conversion of Fe(III) to Fe(II) is 87 mAhg$^{-1}$ using the molecular weight of EMIFeCl$_4$. As described herein, 73% of this theoretical capacity has been achieved.

Examples

Materials and Electrolyte Preparation.

Anhydrous 1-ethyl-3-methylimidazolium chloride (EMICl), FeCl$_3$, AlCl$_3$, and NaCl were purchased from Sigma-Aldrich Co. NaSICON was supported by Ceramatec, Inc. All materials were stored and used in a glove box under an argon atmosphere. The ionic liquid catholyte was prepared by mixing the anhydrous EMICl, FeCl$_3$, NaCl, and AlCl$_3$ in a molar ratio of 1:1:1:1. EMICl and FeCl$_3$ spontaneously fused to an ambient temperature liquid. The AlCl$_3$ and NaCl were added, and a homogeneous solution was obtained after heating at about 200° C. for about 30 min. If the temperature is raised above 160° C., the color of the melt darkens, thought to be due to the effect of temperature on the Fe—Cl charge transfer band. However, the cell performance appeared to be unaffected up to 200° C.

Conductivity Determinations.

Conductivities of transition metal-containing ionic liquid electrolytes of interest were surveyed using twin Pt wire dip-type electrodes sealed into stainless steel threaded caps that were screwed onto glass vials containing the samples loaded under nitrogen in a drybox. The sealed cells were weighed before and after measurements to monitor sample integrity. Data were taken using a PAR VMP2 potentiostat (Princeton Applied Research) in the frequency range 10-100

KHz, during slow heating from ambient to 200° C. and also during cooling to confirm that ramp rates were slow enough to yield equilibrium data and to ensure that no sample decomposition or crystallization occurred in the temperature range of study. Frequency independent conductivity values were obtained from Nyquist plots following the precautions discussed in Tucker et al., "Approaches to, and Problems with, Ionic Liquid Electrolytes for Alkali Metal Electrochemical Devices: The Case of Low-Melting Chloroaluminate Binary Solutions," *J. Electrochem. Soc.* 161, printed online DOI: 0013-4651/2014/0161(0012)/H0011/0016/ (2014).

Cyclic Voltammetry.

The electrochemical properties of the catholyte were investigated by cyclic voltammetry (CV) using a potentiostat/galvanostat (Princeton Applied Research, VMP2). A three-electrode cell was employed with platinum as the working and counter electrodes, as well as the reference electrode. The scans performed at 180° C. with a scan rate of 10 mV s$^{-1}$.

Demountable Battery Design and Assembly.

Figure 1A:
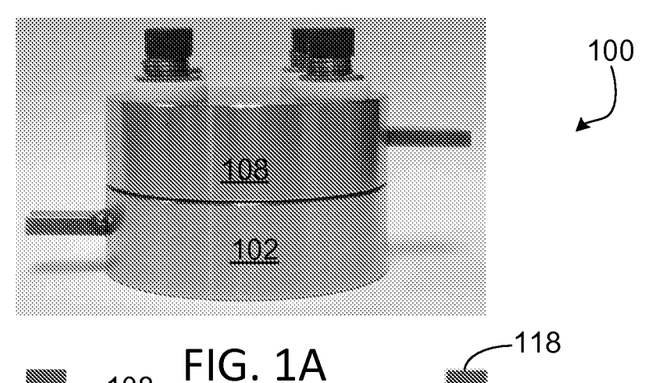
FIG. 1A shows the exterior of a sodium-iron redox battery.
Figure 1B:
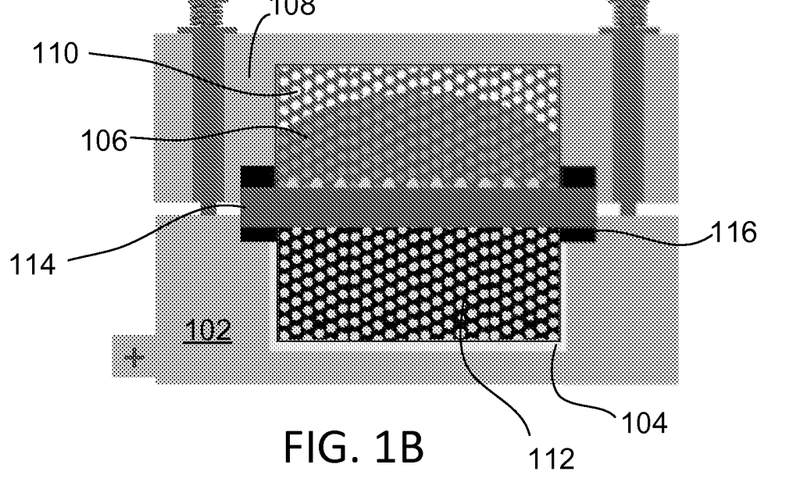
FIG. 1B depicts an interior of the battery shown in FIG. 1A.

The test cell used in the in depth evaluation of the catholyte is a planar design utilizing flat VITON gaskets to seal the anode compartment during an initial sodium wetting procedure at temperatures up to 300° C., and subsequently, following a partial disassembly, to attach and seal in the cathode compartment. The assembled cell 100 is shown in FIG. 1A and a cross-sectional view of the cell is depicted in FIG. 1B. The cathode compartment 102 was protected from reaction with the Fe(III) of the catholyte with a protective layer 104. As used, the cathode compartment 102 was formed from stainless steel and the protective layer 104 was formed of platinum foil. However, any other inert materials could be used as the protective layer.

Figure 1C:
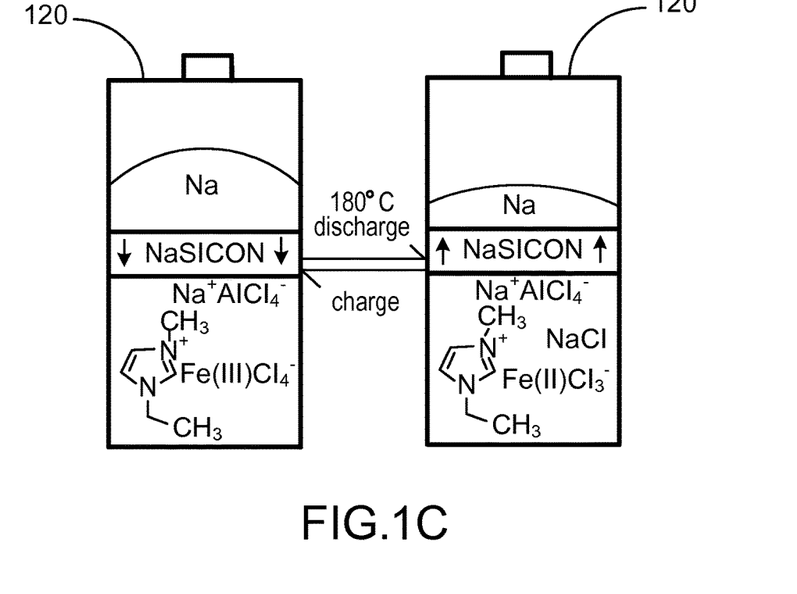
FIG. 1C depicts a working mechanism of the Na—Fe (redox) battery using ionic liquid $EMIFeCl_4$—$NaAlCl_4$ as catholyte and liquid sodium as anolyte.

Anode material 106 was introduced into the anode compartment 108 in an initial stage to take advantage of a ceramic-wetting procedure described below. As used, the anode material was sodium metal. Porous material was used as a first current collector 110. As used, porous material was copper wool (350 mg, density: 1.75 g cm$^{-3}$). Other suitable materials for the collector include carbon felt and the like. The open structure allowed for volume expansion and contraction of the anode material during operation. Liquid EMIFeCl$_4$—NaAlCl$_4$ (50 mole % NaAlCl$_4$) was absorbed in a second current collector 112. The current collector 112 was a porous material that also provided a wicking effect that ensured effective catholyte contact with the separator 114. As used, the current collector 112 was formed of carbon felt (3 mg, density: 0.08 g cm$^{-3}$), and the separator 114 was formed of NaSICON. The NaSICON separator 114 was coated with indium tin oxide (ITO). Alternative separator materials include beta-alumina. A gasket 116 and elements 118 were used to seal the cathode compartment 102 and the anode compartment 108 about the separator 114. As used, the gasket was formed of VITON. FIG. 1C depicts a working mechanism of the Na—Fe (redox) battery 120 using ionic liquid EMIFeCl$_4$—NaAlCl$_4$ as catholyte and liquid sodium as anolyte.

NaSICON Separator Preparation and Wettability Testing.

Figure 2:
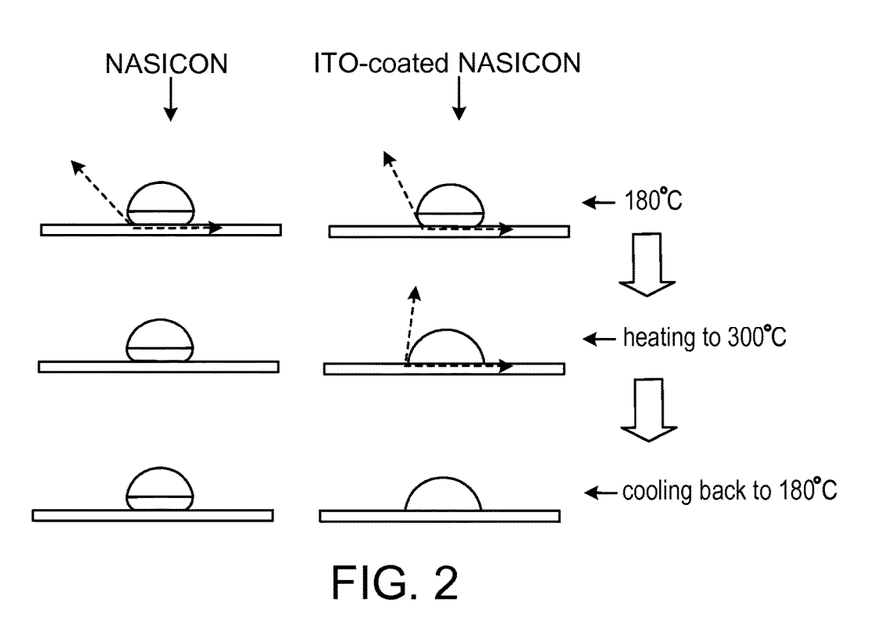
FIG. 2 shows liquid sodium wetting of NaSICON in an untreated state and in an indium tin oxide (ITO) coated state.

A sessile drop technique was used to test the wettability of NaSICON of sodium, with and without ITO coating. Complete wetting of the liquid on a solid surface indicates that the contact angle is zero or close to zero, such that the liquid spreads over the surface easily. Contact angles greater than 90° allow the liquid to ball up and thereby run easily off the surface. Solid sodium pieces were placed on the NaSICON discs heated on a hot plate in a glove box with low H$_2$O and O$_2$ (<0.1 ppm), and the temperature raised and lowered in the sequence indicated in FIG. 2. FIG. 2 shows liquid sodium wetting of untreated NaSICON (left) and NaSICON coated with ITO (right) for comparison. The test was carried out with the treated and untreated NaSICON discs side by side so that the time-temperature conditions were identical. It can be seen that the spreading of the sodium on the ITO coated disc was not altered upon cooling. Without the ITO coating, it was found that the battery could not be reversibly charged and discharged at 140° C., due at least in part to limited wetting of the liquid sodium on the ceramic disc. Concerning the thickness of the ITO coating, it was noted first that the sputtering was designed for minimal and discontinuous coverage. An average of island heights was 5 nm based on amount of ITO sputtered (not all reached the target).

Result.

Figure 3:
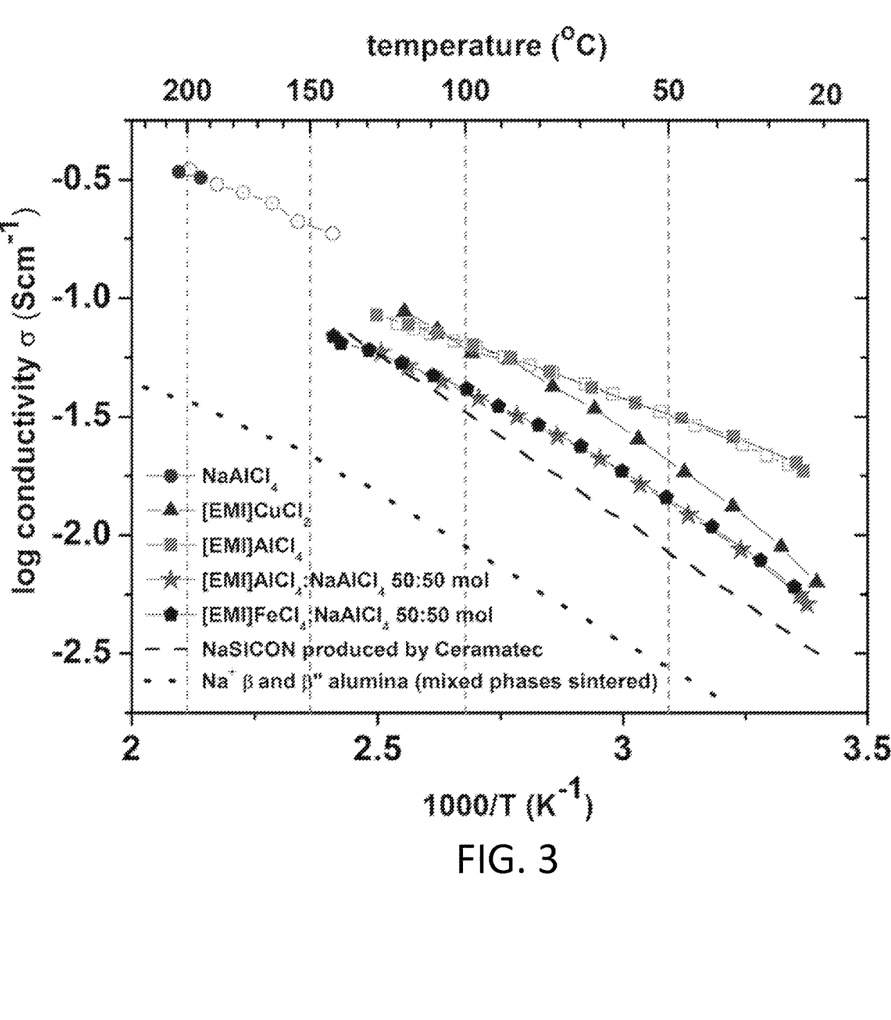
FIG. 3 shows specific conductivities of ionic liquids and their mixtures with sodium analogs.

The conductivities of the several ionic liquids and mixtures are plotted as Arrhenius functions of temperature in FIG. 3. The data for [EMIAlCl$_4$] and its 1:1 mixture with NaAlCl$_4$ are taken from Tucker et al. It is notable that essentially identical results were obtained when Al was replaced by Fe in the same oxidation state, indicating that alkali cation trapping occurred in both solutions. Likewise, most of the conductivity deficit due to the alkali ion trapping was eliminated by raising the temperature to above 100° C. Comparisons with the two common Na conducting ceramic separators, β'-β" alumina and NaSICON, are included in FIG. 3.

FIG. 3 shows specific conductivities of several ionic liquids and their mixtures with Na analogs. Open symbols represent data taken during cooling, and filled symbols represent data taken during heating. For EMIFeCl$_4$, data from three consecutive runs coincided within measurement uncertainty. The conductivities for this IL superimpose on those for EMIAlCl$_4$ from Tucker et al. The mixtures with alkali salts show lower conductivities and larger temperature dependences, which may be attributed to alkali cation trapping phenomena. Comparison is made with the conductivity of the two common sodium ion conducting ceramics, Na mixed and sintered β'-β" alumina, and NaSICON.

Figure 4A:
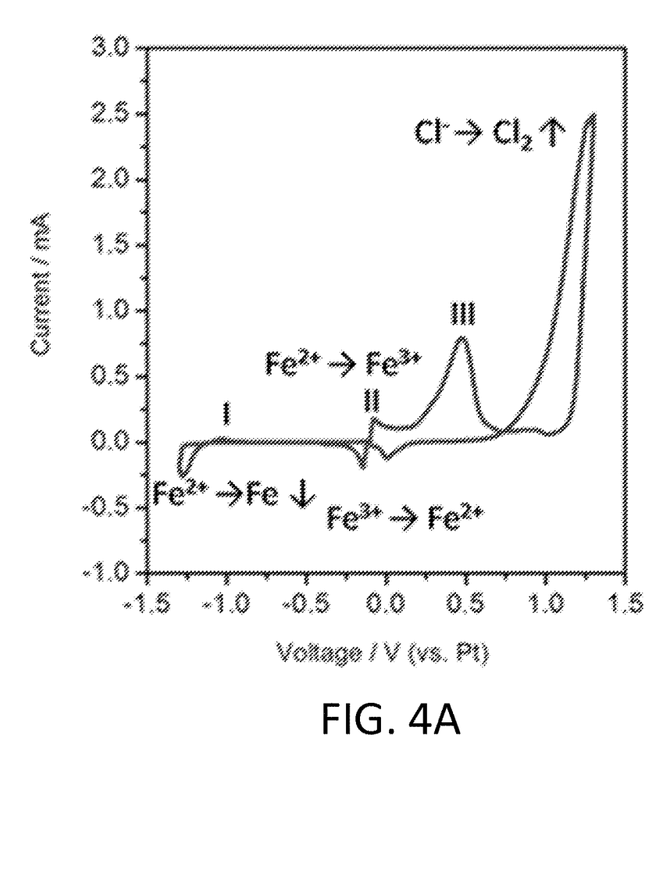
FIGS. 4A and 4B show cyclic voltammograms of EMIFeCl$_4$—NaAlCl$_4$ catholyte for different voltage ranges.
Figure 4B:
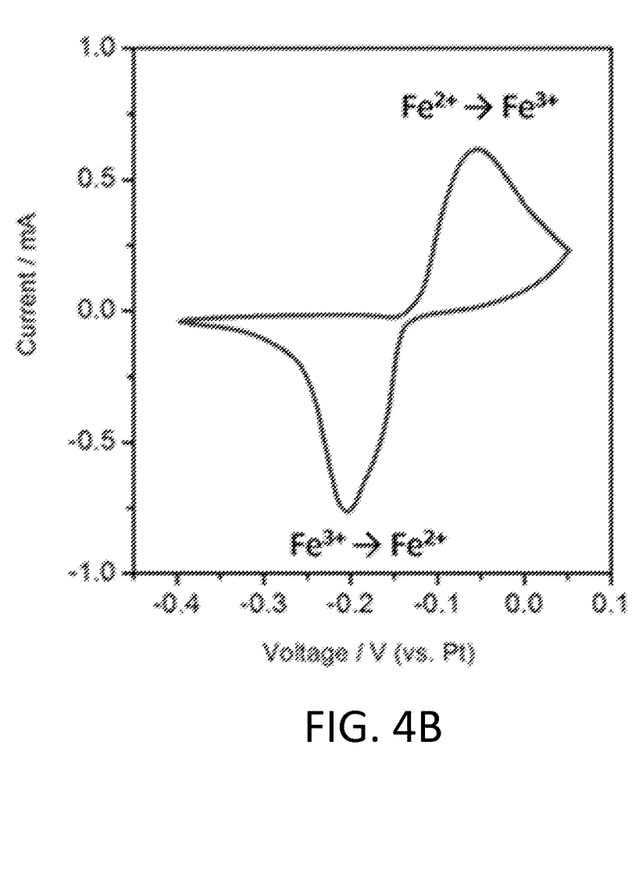

The electrochemical behavior of the catholyte liquid [EMI][AlCl$_4$]$_{0.5}$[NaFeCl$_4$]$_{0.5}$ is demonstrated by the cyclic voltammograms shown in FIGS. 4A and 4B. Platinum was used as reference electrode, with a scan rate of 10 mVs$^{-1}$ and T=180° C. Processes associated with different peaks, or displacements, are indicated on the plots. The third oxidation peak is not identified, but is thought to relate to the irreversible (due to passivation) deposition of metallic iron seen at the leftmost part of the plot. This process was avoided in the more restrictive plot seen in FIG. 4B, where only the range of the Fe(II)—Fe(III) oxidation process and its converse, were selected for study.

In FIG. 4A, the scan covers the potential range that includes the reduction to metallic iron at the negative extreme and the oxidation of chloride ion to chlorine gas at the positive extreme (−1.3 V to 1.3 V). The re-oxidation of metallic Fe deposited at −1.2 V is only weakly manifested at −1.1 V possibly due to passivation, which may be the source of the third oxidation peak at +0.5 V. FIG. 4B shows the reversible redox process for the Fe(II)—Fe(III) couple when the potential range is limited to avoid the latter process (−0.4~0.05 V).

Figure 5:
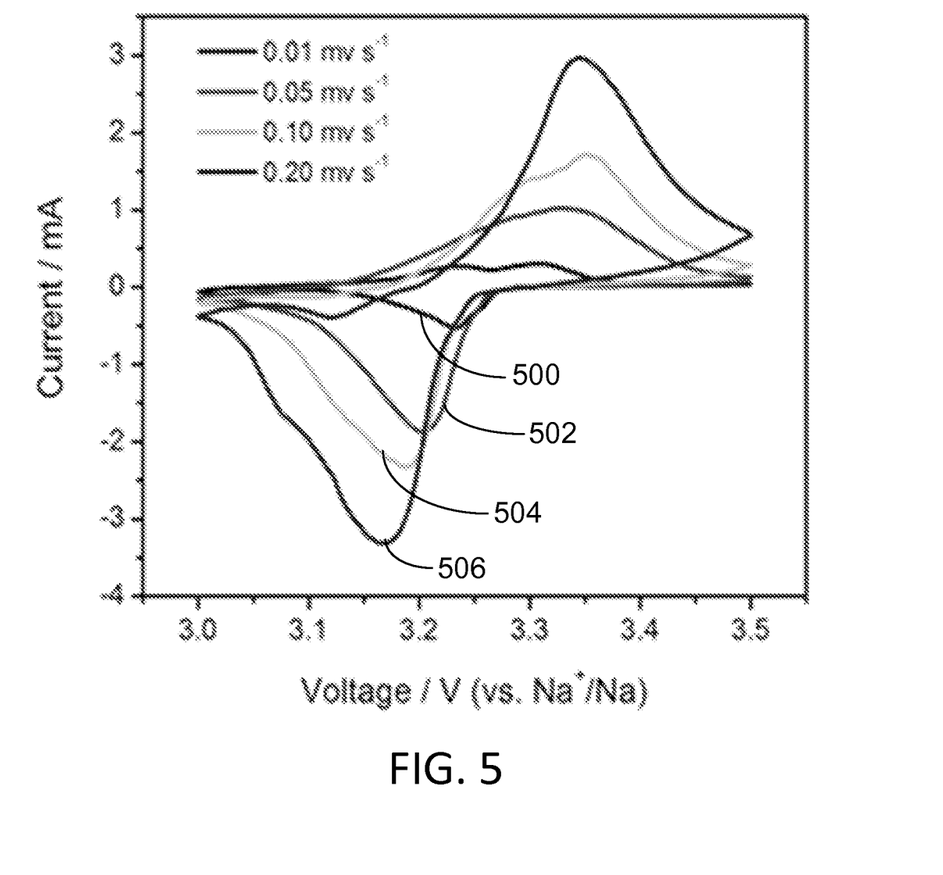
FIG. 5 shows cyclic voltammograms at 180° C. for a sodium-iron battery taken at different scan rates.

This reversible process can also be seen in the assembled battery context, now by reference to the anode process Na/Na$^+$. Plots 500, 502, 504, and 506 of FIG. 5 show cyclic voltammograms at 180° C. for the assembled cell, taken at scan rates of 0.01 mVs$^{-1}$, 0.05 mVs$^{-1}$, 0.10 mVs$^{-1}$, and 0.20 mVs$^{-1}$, respectively, in the range of 3.0 V to 3.5 V, where the cathode redox process is occurring. It can be seen that at slow rates there are two steps in the redox process while, at higher rates, the major process begins at the same potential during oxidation as it is does on reduction, implying a high order of reversibility in this process. The cell voltage, 3.25±0.05 V, taken from these onset points, is considerably higher than those of either of the common "liquid sodium" batteries, Na—S (2.0 V) or Na—NiCl$_2$ (2.58 V).

Figure 6A:
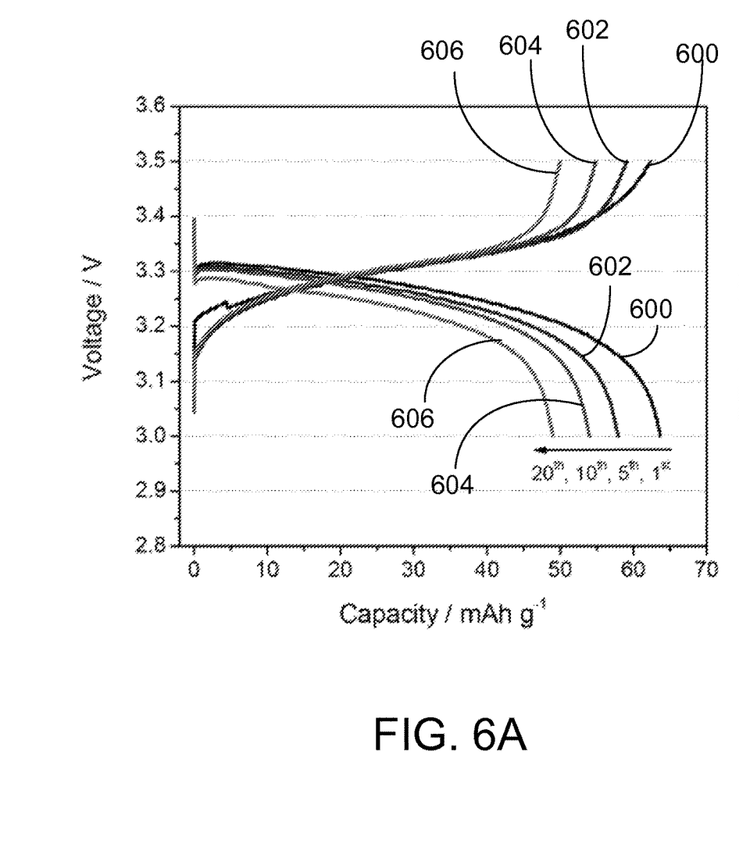
FIG. 6A shows charge/discharge curves for different cycles of a sodium-iron battery at 180° C., with a discharge rate of 0.1 C and a charge rate of 0.05 C.
Figure 6B:
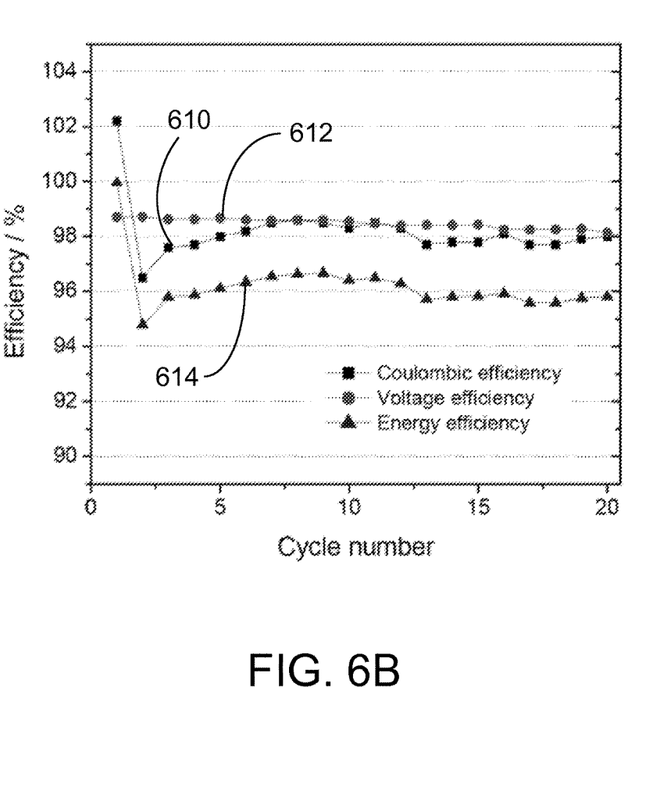
FIG. 6B shows coulombic, voltage and energy efficiencies as a function of cycle number for the sodium-iron battery associated with FIG. 6A.

The cell was conditioned by an initial charge/discharge cycle conducted at very slow rates (0.02 C over 10 hours). Following such conditioning, the cell was cycled using a slower charging rate than discharge rate to redissolve the precipitated NaCl. Similar asymmetric kinetics are also seen for Na—S and Na—NiCl$_2$ cells. The voltage versus capacity behavior during the first 20 cycles is shown in FIGS. 6A and 6B. Plots 600, 602, 604, and 606 of FIG. 6A show charge/discharge curves for cycles 1, 5, 10, and 20, respectively, of the Na—Fe battery at 180° C. The discharge rate is 0.1 C and charge rate is 0.05 C. Before the cycling, a conditioning process was performed by charging/discharging at a low rate of 0.02 C for 10 hours. Plots 610, 612, and 614 of FIG. 6B shows Coulombic, voltage, and energy efficiencies, respectively, as a function of cycle number. The cell cycles well near its reversible potential, however, a source of capacity loss (23% after 20 cycles) was observed.

An energy efficiency of 96.2% was calculated from the ratio of the product [cell capacity (to cutoff)×midpoint voltage] in successive charge-discharge cycles:

$$\text{Energy efficiency} = \frac{\int v_{discharge} i_{discharge} dt}{\int v_{charge} i_{charge} dt} \approx \frac{V_{mid-discharge} C_{discharge}}{V_{mid-charge} C_{charge}},$$
$$= \text{(voltage efficiency)(coulombic efficiency)}$$

which is shown in FIG. 6B. This quantity is related to, but is smaller than, the Coulombic efficiency, which is also shown in FIG. 6B. For energy storage purposes, high energy efficiency, which requires a highly reversible electrochemical system, is very important. The Coulombic efficiency at 98.2% is also high, and neither shows any adverse trend with cycle number.

The high energy efficiency suggests that there is little dissipation of energy in overcoming potential barriers at the electrolyte-electrode surfaces, and no important side reactions, even at the moderately high temperatures used. The efficiency also suggests that the IR losses involved in passage of sodium ions across the ceramic separator, and within the electrolyte, are not a serious source of energy inefficiency.

Based on the cathode active component EMIFeCl$_4$, its theoretical capacity is calculated to be 87.0 mAh g$^{-1}$. Given the OCV of 3.31V and the liquid density of 1.45 g ml$^{-1}$, the theoretical energy densities are 288 Wh kg$^{-1}$ and 418 Wh L$^{-1}$. The capacity in the first cycle of FIG. 6A is 64.5 mAh g$^{-1}$, which is 73% of the theoretical capacity. While the cell cycles well near its reversible potential, a source of capacity loss (23% after 20 cycles) is present. The source of the loss may be associated with slow redissolution of precipitated NaCl, or of the higher-melting product EMIFeCl$_3$ (which could be ameliorated by including extra EMIAlCl$_4$ in the catholyte).

In the case of failure of the solid ceramic separator, the anode material can make direct contact with the catholyte, with direct release of the stored energy. The direct reactions between the anodic active material (molten metallic sodium) and the catholyte (EMIFeCl$_4$—NaAlCl$_4$) lead to solid or unreactive liquid—not gaseous—products, according to the following equations.

$$3Na + EMIFeCl_4 \rightarrow EMICl + 3NaCl + Fe \qquad (4)$$

$$3Na + NaAlCl_4 \rightarrow 4NaCl + Al \qquad (5)$$

Since no gases are produced, there is generally no potential for explosion unless the heat of reaction is instantly released. The potential for hazard by direct contact of liquid sodium and catholyte was tested by pouring the active catholyte liquid directly onto shiny molten sodium in a container in a low pO$_2$ dry box. No hazardous response was observed. The sodium was slowly blackened as it reduced the metal ions in the catholyte. Thus, the fire hazard from internal shorts in this system are understood to be minimal.

Another practical consideration is materials cost, which may account for about 80% of total cell cost for batteries manufactured in large volume by automated equipment. The Na—Fe(redox) battery is expected to have a low cost since the elements involved, Na, Fe, and Al, are cheaper than battery materials such as Li, Co, and Ni. In addition, NaSICON may be considerably less expensive than β-alumina, thus providing further motivation for exploring redox catholyte strategies for medium temperature electrochemical energy storage.

Multivalent metals, such as an aluminum, may also be used as a safe, alternative anode. In one example, solid aluminum maintained in a bath of a similar ionic liquid to that used in the cathode contained chloroaluminate anions at sufficient acidity for facile Al deposition (see e.g., Weaving et al, *J. Power Sources*, 36, 1991, 537; and Li et al., *J. Power Sources*, 2002, 110, 1). Additional Al$^{3+}$ ions generated in the discharge cause Na$^+$ ions from the bath to migrate to the cathode compartment, and the cell reaction is then completed as in the Na anode described herein.

For higher voltages, a Mn(II)/Mn(III) may be used, as well as multielectron transfer couples such as Cr(III)/Cr(VI) (or the less toxic molybdate analog), which are reversible both in aqueous acid systems and in high-temperature oxidic solvents.

The catholyte described herein is an ambient temperature, freely flowing liquid capable of serving in a flow battery system, or in a facility in which spent catholyte is drained out and replaced with a fully oxidized catholyte of low sodium content (since Na$^+$ ions are generated on discharge). Typically, the system would carry excess sodium metal, and the number of such "quick recharges" would be limited by this sodium supply. Replenishment of the sodium supply may be accomplished by a normal electrochemical recharging process.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A battery comprising:
   an anode current collector;
   an anode in contact with the anode current collector;
   a cathode current collector;
   a liquid cathode in contact with the cathode current collector, wherein the liquid cathode comprises a catholyte solution comprising:
   an ionic liquid or ionic liquid mixture, wherein the ionic liquid comprises 1-ethyl-3-methylimidazolium chloride (EMICl);
   a redox couple or one half of a redox couple; and
   a sodium salt,
   wherein the one half of the redox couple comprises a metal in a first oxidation state that is oxidized or reduced to yield the metal in a second oxidation state, and the redox couple comprises the metal in the first oxidation state and the metal in the second oxidation state; and
   a solid electrolyte separating the anode current collector and the cathode current collector, wherein the solid electrolyte is permeable to sodium ions and is in contact with the anode and the liquid cathode.

2. The battery of claim 1, wherein the metal in the second oxidation state can be reduced or oxidized to yield the metal in the first oxidation state.

3. The battery of claim 2, wherein the redox couple comprises Fe(II) and Fe(III).

4. The battery of claim 2, wherein the redox couple comprises Mn(II) and Mn(III).

5. The battery of claim 2, wherein the redox couple comprises Cu and Cu(II).

6. The battery of claim 2, wherein the redox couple comprises Cu and Cu(I).

7. The battery of claim 2, wherein the redox couple comprises Cu(I) and Cu(II).

8. The battery of claim 2, wherein the redox couple comprises Cr(III) and Cr(VI).

9. The battery of claim 1, wherein the ionic liquid is a salt or a combination of salts in the liquid state below 100° C.

10. The battery of claim 1, wherein the catholyte solution comprises an aluminum salt.

11. The battery of claim 10, wherein the aluminum salt comprises aluminum chloride.

12. The battery of claim 1, wherein the sodium salt comprises sodium chloride.

13. The battery of claim 1, wherein the solid electrolyte comprises a material having the general formula $Na_{1+x}Zr_2Si_xP_{3-x}O_{12}$, wherein $0<x<3$.

14. The battery of claim 1, wherein the solid electrolyte is coated with indium tin oxide.

15. The battery of claim 1, wherein the battery delivers at least 70% of its theoretical energy density.

16. The battery of claim 1, wherein the energy efficiency (E %) of the battery, calculated as:

$$\text{Energy efficiency} = \frac{\int v_{discharge} i_{discharge} dt}{\int v_{charge} i_{charge} dt} \approx \frac{V_{mid-discharge} C_{discharge}}{V_{mid-charge} C_{charge}},$$
$$= (\text{voltage efficiency})(\text{coulombic efficiency})$$

is at least 90%.

17. The battery of claim 1, wherein the Coulombic efficiency of the battery is at least 95%.

18. The battery of claim 1, wherein the anode comprises liquid sodium or sodium alloy at a temperature in a range between 100° C. and 200° C.

* * * * *

UNITED STATES PATENT AND TRADEMARK OFFICE
CERTIFICATE OF CORRECTION

Page 1 of 1

PATENT NO. : 10,424,803 B2
APPLICATION NO. : 15/508032
DATED : August 29, 2017
INVENTOR(S) : Angell et al.

It is certified that error appears in the above-identified patent and that said Letters Patent is hereby corrected as shown below:

On the Title Page

Item (72) Inventor is corrected to read:
-- Charles Austen Angell, Mesa, AZ (US);
Leigang Xue, Tempe, AZ (US);
Telpriore Greg Tucker, Phoenix, AZ (US) --.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*